June 30, 1953 C. E. SHARP 2,644,077

AUTOMATIC FREQUENCY CONTROL FOR RECEIVER-TRANSMITTER

Filed Dec. 6, 1945

INVENTOR.
CHESTER E. SHARP
BY William D. Hall
ATTORNEY

Patented June 30, 1953 2,644,077

UNITED STATES PATENT OFFICE 2,644,077

AUTOMATIC FREQUENCY CONTROL FOR RECEIVER-TRANSMITTER

Chester E. Sharp, Little Silver, N. J., assignor to the United States of America as represented by the Secretary of War Application December 6, 1945, Serial No. 633,254

1 Claim. (Cl. 250—13)

(Granted under Title 35, U. S. Code (1952), sec. 266)

The invention described herein may be manufactured and used by or for the Government for governmental purposes, without the payment to me of any royalty thereon.

My invention relates to a combined radio transmitter and receiver, and particularly to means for stabilizing the operating frequency thereof.

It is a principal object of my invention to provide simplified means for stabilizing the operating frequency of a combined transmitter and receiver of the frequency modulation type.

A further object of my invention is to provide a crystal-controlled frequency modulation system in which a single crystal stabilizes both the tuning of the receiver and the center, or resting, frequency of the transmitter.

In accordance with a preferred embodiment of my invention, the transmitter is frequency modulated by means of a reactance tube which varies the operating frequency of a master oscillator. The receiver is preferably of the superheterodyne type in which a piezoelectric crystal is used to stabilize the frequency of the local oscillator. The output of the frequency-modulation detector, or frequency discriminator, provides the audio signal as well as a frequency-dependent potential which is fed to the reactance tube to control the center frequency of the transmitter.

For a better understanding of the invention, together with other and further objects thereof, reference is had to the following description taken in connection with the accompanying drawing, wherein like parts are indicated by like reference numerals and wherein.

Figure 1:
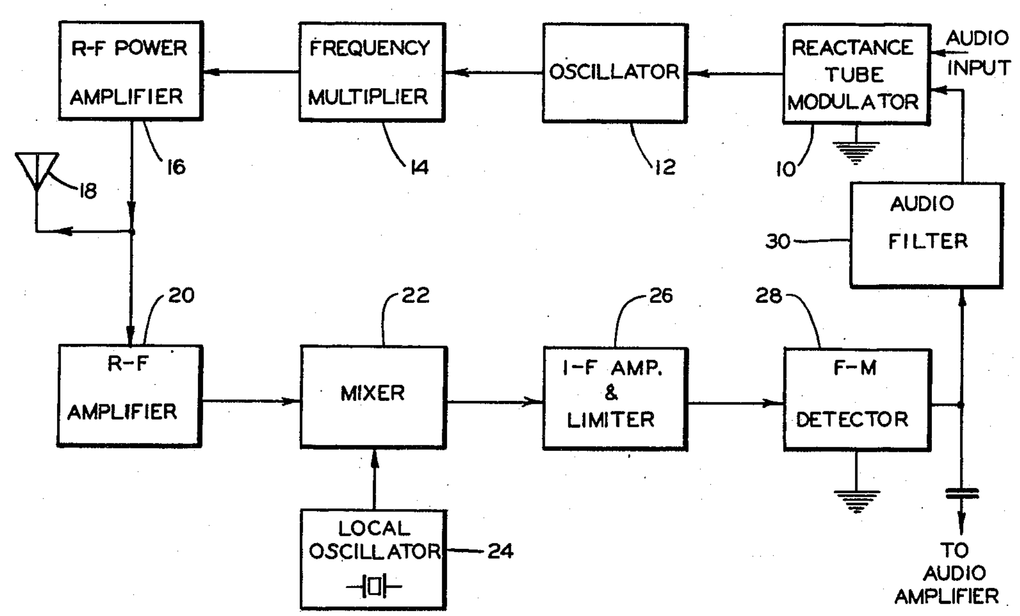
Figure 1 is a block diagram of my invention.

Referring to Fig. 1, there is shown a frequency modulated transmitter including a reactance tube circuit 10 which is coupled to the tank circuit of a master oscillator 12. Audio signals, such as those derived from a microphone circuit, are impressed upon a control grid of the reactance tube to vary the effective reactance thereof, whereby the frequency of the oscillator 12 is deviated to an extent proportional to the modulation voltage. The frequency modulated output of oscillator 12 is then applied to a buffer amplifier and frequency doubler 14 and a radio frequency power amplifier 16, and then radiated through an antenna 18.

Signals received on the antenna as well as the transmitted signals, are impressed upon a frequency modulation receiver, which in this case is of the superheterodyne type. The receiver includes a radio frequency amplifier 20, a frequency changer, including a mixer 22 and a crystal-controlled local oscillator 24, an intermediate frequency amplifier and amplitude limiter 26, and a frequency modulation detector 28, which demodulates the received signal and yields an audio frequency output which may be amplified by an audio frequency amplifier and then translated by means of a sound reproducer or the like.

In frequency modulation systems wherein the master oscillator is frequency modulated by variation of the reactance of the tank circuit thereof, as is the case with the circuit above described, it is necessary to use an oscillator which is not stiff, so that its frequency can be readily modulated. Such oscillators are, however, inherently unstable in frequency so that the center frequency thereof is subject to considerable drifting. To overcome this objection, it is a feature of my invention to use the output of detector 28 to stabilize the center frequency of oscillator 12.

As is well known in the art, the frequency modulation detector 28 is usually so tuned that it provides a zero output at the center, or resting, frequency of the incoming signal, said output varying in magnitude as a function of the deviation of the signal frequency from said center frequency, and varying in polarity as a function of the direction of said deviation. The intermediate frequency applied to detector 28 is determined by the difference between the frequencies of the transmitted output and the local oscillator 24. Since the local oscillator 24 is crystal controlled, its frequency is stable. Hence, only variations in the center frequency of master oscillator 12 will cause a change in the center frequency of the signal applied to detector 28, and will result in the generation of an error voltage in the output of detector 28. This voltage, which may be amplified by a direct current amplifier if necessary, is applied, through a filter 30, which keeps out the audio currents, to a control grid of reactance tube modulator 10. The error voltage impressed on said reactance tube modulator 10 is of such magnitude and polarity that it will vary the frequency of oscillator 10 to such an extent and in such direction that the center frequency applied to the input of detector 10 will be changed to a point where the output of said detector is substantially zero, at which point the master oscillator is operating at the proper center frequency.

Figure 2:
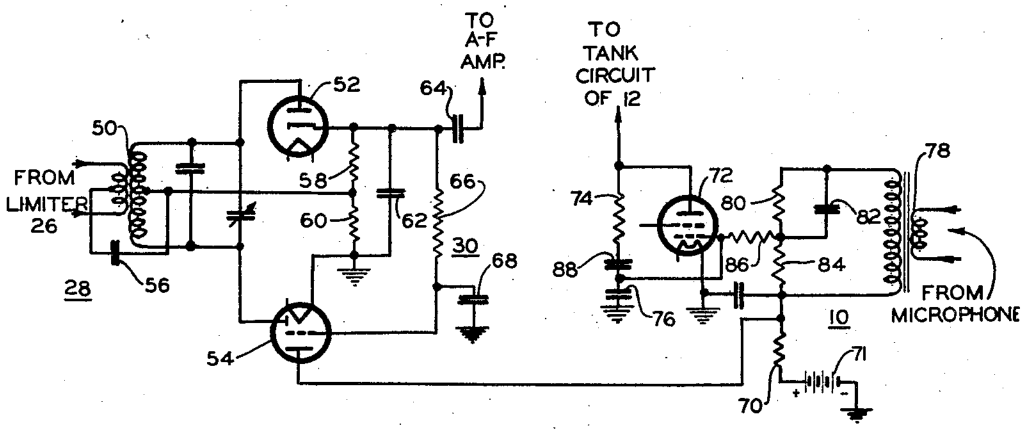
Figure 2 is a schematic circuit diagram of a portion of Fig. 1.

Reference is now made to Fig. 2 for a more detailed description of the frequency modulation detector 28 and the reactance tube modulator 10 and the interconnection thereof. The frequency modulation detector 28 comprises a tuned transformer 50, the primary of which is energized by the limiter output, and the secondary of which is coupled in push-pull to the anode of diode 52 and the anode of the diode section of diode-triode tube 54. A connection is also made from a portion of the primary of the transformer 50, through a blocking condenser 56, to a center tap of the secondary, whereby both diode anodes are also fed in like phase. A connection is also made from said center tap to the junction of two load resistors 58 and 60 connected in series in the cathode circuits of said diodes. A radio-frequency bypass condenser 62 shunts said resistors. One end of said series-connected resistors is grounded. The other end thereof is coupled through a blocking condenser 64 to the audio amplifier circuits of the receiver.

The circuit thus far described is a well known type of frequency modulation detector and need not be described in any great detail. In brief, the diode anodes are fed in like phase by one potential derived from the transformer primary through condenser 56. Said anodes are also fed in opposite phase by a voltage which, because of the tuned transformer action, is 90° phase displaced with respect to said first voltage. At the exact center frequency the vector sum of the voltages applied to the diodes are equal, whereby the output voltages across resistors 58 and 60 oppose and cancel each other. For frequencies displaced from the center frequency the vector sum of the voltages applied to the diodes are unequal, whereby the resultant output voltage across the resistors 58 and 60 is proportional to the amount of said displacement, and the polarity of said output voltage is dependent upon the direction of the frequency displacement.

A portion of the output of the frequency modulation detector 28 is also applied, through audio-frequency eliminating filter 30, comprising resistor 66 and condenser 68, to the grid of the triode section of tube 54, which acts as a direct current amplifier. The amplified voltage appears across the plate load resistor 70 in series with plate potential source 71. The voltage across resistor 70 controls the grid bias of reactance tube 72 of the modulator 10.

Tube 72 functions as an electronic reactance tube by virtue of the fact that a portion of the tank circuit voltage of the master oscillator 12 is shifted 90° by the series-connected resistor 74 and condenser 76. Hence, the current injected into the tank circuit by the plate circuit of tube 72 is phase displaced 90° with respect to the tank circuit voltage, whereby the plate circuit of the tube functions as a reactance. Variation of the voltage on the grid of the tube 72 will, therefore, vary the effective reactance across the tank circuit, and hence the operating frequency of the master oscillator.

The grid voltage of tube 72 is varied in two ways. One way is by applying a portion of the output of the frequency modulation detector, as above described. The other way is by means of the audio signal from the secondary of transformer 78, applied between the grid and cathode of the tube through a predistorting filter, comprising resistor 80 and condenser 82, which emphasizes the high audio frequencies.

Resistors 80 and 84 functions as voltage dividing resistors for the audio signals. Resistor 86 keeps radio frequency currents out of the audio transformer circuit. Condenser 88 is a blocking condenser.

The manner in which the center frequency of master oscillator 12 is kept constant will now be described in greater detail with reference to Fig. 2. If said center frequency is exactly at the proper value, no resultant voltage is developed across the series-connected load resistors 58 and 60. However, if said center frequency drifts either above or below its normal value, a resultant voltage appears across said load resistors, this voltage being positive when the frequency is lower and negative when the frequency is higher. A portion of this resultant voltage is applied to the grid of the triode section of tube 54.

When the center frequency is normal, no voltage appears on the grid of tube 54. Under this condition, and because said grid is operated at zero bias, plate current will flow as follows: From the triode plate through resistor 70, and through battery 71 to ground and return to the filament of tube 54. The direction of this flow is such as to render the grid of reactance tube 72 negative at the normal operating grid voltage.

If the center frequency drifts to a higher value, the grid of tube 72 is rendered less negative, causing an increase in flow of plate current and, as a result, the center frequency is lowered and restored to its normal value.

The reverse occurs when the center frequency drifts to a lower value. This causes the grid to tube 72 to be rendered more negative and results in an increase of the center frequency to its normal value.

Because of the large time constant of filter 30, the demodulated audio signals are kept out of the reactance modulator circuit 10, thus preventing degenerative feedback.

From the above description it will be seen that my invention provides a simple means for stabilizing the center frequency of a frequency-modulated transmitter and receiver by the use of only a single frequency-stabilizing element, in this case a piezoelectric crystal. My invention also provides a side-tone in the output of the receiver when the transmitter is operating on the proper frequency, thereby indicating at all times when the transmitter and receiver are operating properly.

While there has been described what is at present considered a preferred embodiment of my invention, it will be obvious to those skilled in the art that various changes and modifications may be made therein without departing from the invention, and it is aimed in the appended claim to cover all such changes and modifications as fall within the true spirit and scope of the invention.

I claim:

In combination, a frequency modulation transmitter and receiver both connected in parallel to a common antenna and both simultaneously operative, said transmitter comprising an oscillator, a reactance tube circuit for modulating the frequency of said oscillator; said receiver comprising a stable local oscillator, a mixer, an intermediate frequency amplifier tuned to the frequency difference of said oscillators, a frequency variation detector for demodulating the output of said amplifier, and a transducer for transforming the output of said detector into sensory signals; and means including a signal eliminating filter coupled between said detector and said reactance tube to maintain said frequency difference substantially constant.

CHESTER E. SHARP.

(References on following page)

References Cited in the file of this patent

UNITED STATES PATENTS

| Number | Name | Date |
|---|---|---|
| 2,333,719 | Herold | Nov. 9, 1943 |
| 2,379,395 | Ziegler et al. | June 26, 1945 |
| 2,401,717 | Wolf et al. | June 4, 1946 |
| 2,408,826 | Vogel | Oct. 8, 1946 |

FOREIGN PATENTS

| Number | Country | Date |
|---|---|---|
| 551,472 | Great Britain | Feb. 24, 1943 |

OTHER REFERENCES

Signal Corps Laboratories Annual Report for Fiscal Year 1937 on Means of Detecting the Approach of Aircraft and Marine Surface Craft Beyond Visual Range (pages 10 and 11).